Dec. 30, 1941.  C. E. HATHORN  2,268,211
CLAMP
Filed Jan. 3, 1941  2 Sheets-Sheet 1

INVENTOR
CHARLES E. HATHORN.
BY
ATTORNEY

Dec. 30, 1941.  C. E. HATHORN  2,268,211
CLAMP
Filed Jan. 3, 1941  2 Sheets-Sheet 2
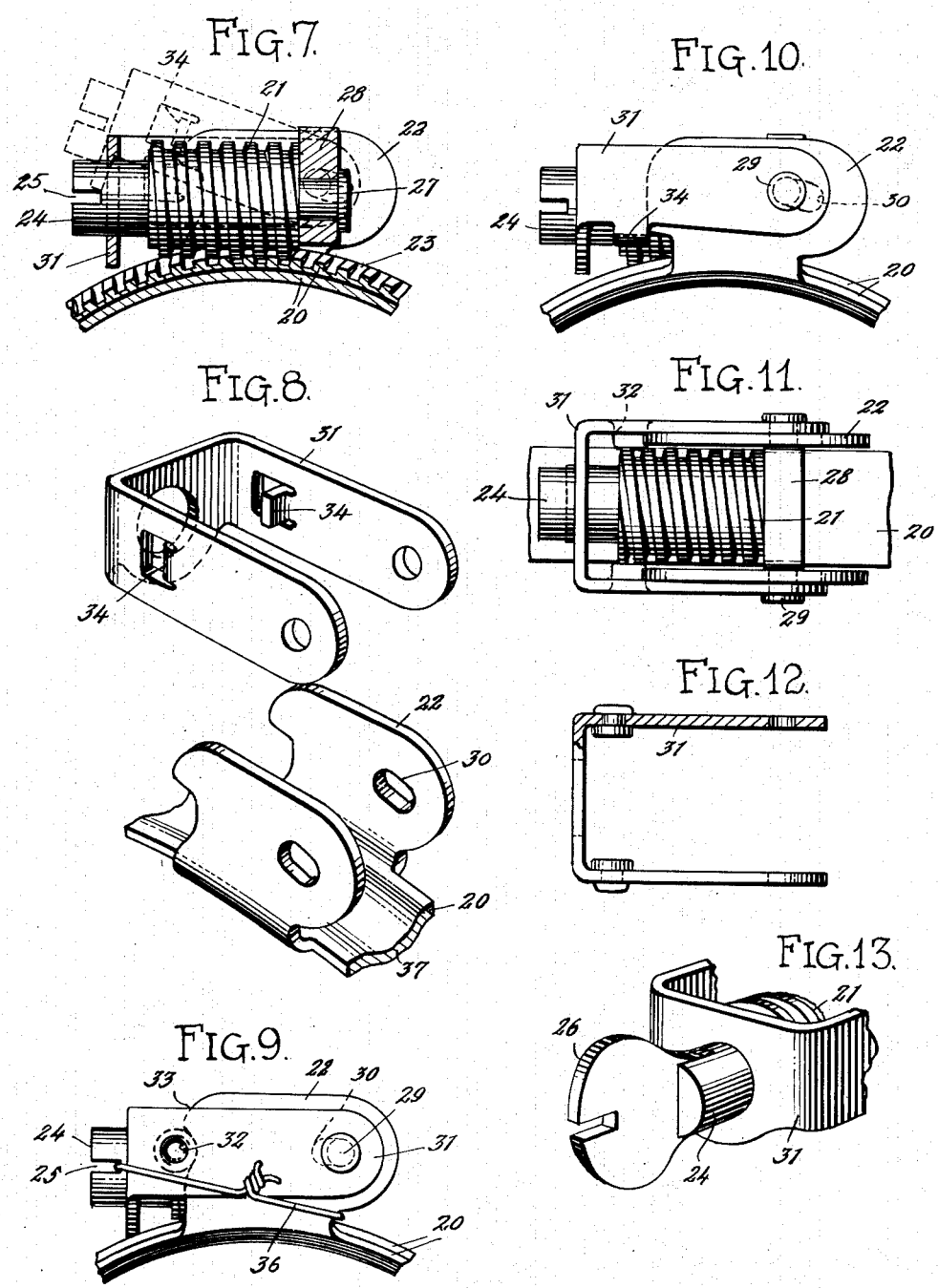
INVENTOR
CHARLES E. HATHORN.
BY
ATTORNEY Patented Dec. 30, 1941

2,268,211

UNITED STATES PATENT OFFICE 2,268,211

CLAMP

Charles E. Hathorn, Kenmore, N. Y.

Application January 3, 1941, Serial No. 373,005

5 Claims. (Cl. 24—19)

My invention relates to clamps, and more particularly to hose clamps of the character described in my U. S. Patents Nos. 1,584,935, dated May 18, 1926, and 2,189,172, dated February 6, 1940, respectively.

While thousands of clamps of the character described in said issued patents have been and are now being manufactured and extensively used, it is nevertheless a fact that such clamps are not entirely foolproof nor are they nearly so close to perfection as it has lately been discovered they can be made. One drawback to the previously developed clamp is that in spite of the fact that the operating screw has been extended, the screw driver, in a tightening operation, can still and occasionally does foul the band, and as a result inadvertently disengage the screw. This is objectionable and at times quite annoying, particularly where a tightening of the clamp is attempted in a more or less inaccessible location. Another drawback is that the relatively coarse threads used require the expenditure of considerable effort in a clamp tightening operation. Still another drawback is that resulting from the use of a so-called "thru-cut" thread. Threads thus formed weaken the band and not infrequently cause it to break in careless handling or in attempting to tighten the clamp excessively. These and other lesser evils, inherent in clamps of the character disclosed in my said issued patents led me to attempt to discover ways and means of improving it or them. Such improvements constitute the basis of the present application.

The principal object of the present invention is to improve the self-locking characteristics of the clamp. Instead of a lock means such as that disclosed in Patent No. 2,189,172, self-locking is obtained by so mounting the screw as to admit of an axial shift thereof by and in response to screw rotation. As in the earlier types of clamp the locking screw is pivotally movable into and out of interfitting engagement with the threads or teeth of the band. The screw, however, in the present invention, instead of being manually locked in threaded engagement with the band teeth, is automatically so locked; not by a cotter or the like as heretofore proposed, but automatically by means wholly responsive in its action to the aforementioned axial shift which in turn results from a mere tightening of the screw.

Other objects of the invention, such for instance as the redesign of the band and screw teeth to achieve a distinct improvement in the functioning of the clamp, will be hereinafter more fully set forth.

In the drawings, wherein like reference characters denote like or corresponding parts throughout the several views:

Fig. 7 is a view similar to Fig. 3 illustrating a modified form of screw support or carrier;

Fig. 8 is a perspective view of that form of screw carrier illustrated in Fig. 7; the carrier and that part of the clamp to which it is normally pivotally fastened having been separated for illustrative purposes;

Fig. 9 is an enlarged side elevation of the screw assembly illustrating a modified form of locking means;

Fig. 10 is a view similar to Fig. 9 illustrating a still further modification of the carrier;

Fig. 11 is a plan view of the assembly shown in Fig. 10;

Fig. 12 is a fragmentary sectional view of the screw carrier showing still another modified form of locking detent; and Fig. 13 is a perspective view showing a possible modification in the end form of the clamping screw.

As in my previously patented clamps, the clamp of the present invention comprises a tough flexible metallic band 20 and an operating or clamping screw 21. The screw 21 is carried by ears 22 either integral with or fastened to the band 20 toward one end thereof. Adjacent to the opposite end of the band from the end to which the ears 22 are fastened, the band is provided with teeth 23 similar in pitch and form to the teeth of the screw with which they are adapted to interfit.

Figure 1:
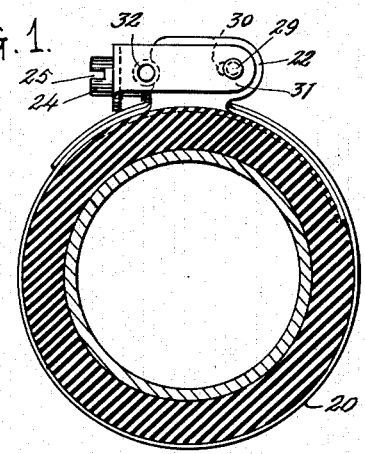
Fig. 1 is an edge view of the clamp; the hose to which it is applied being shown in section.
Figure 2:
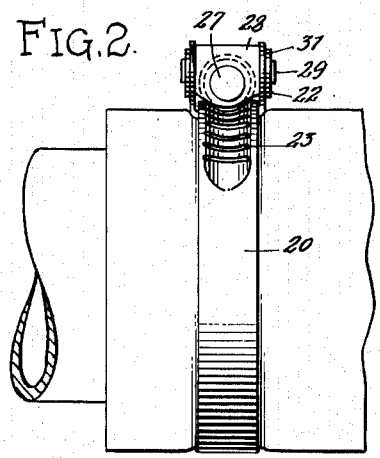
Fig. 2 is a side elevation of the clamp and hose assembly of Fig. 1.
Figure 3:
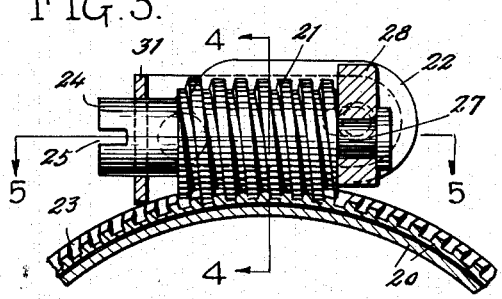
Fig. 3 is an enlarged sectional view showing the manner in which the operating or clamping screw is mounted.
Figure 4:
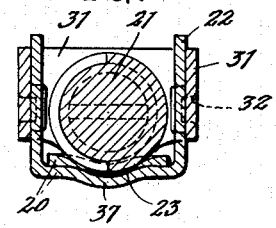
Fig. 4 is a section on the line 4—4 of Fig. 3.

The clamping screw 21, at its free end, is preferably extended as at 24, and such extended end is provided with either a screw driver slot 25, as illustrated in Figs. 1, 2, 7, 9 and 10, or with a thumb piece 26, as illustrated in Fig. 13. At its opposite end, as by means of a journal extension 27, the screw is journaled for rotation about its longitudinal axis in a disc 28 pivotally fastened as by trunnions 29 which engage respectively in slots 30 formed in the ears 22 of the band. The slots 30 may be substantially straight, as shown in Figs. 1, 3 and 9, or they may be slightly angled, as shown in Figs. 7, 8 and 10. If angled, an even tighter contact between the screw and band will result than that obtainable where substantially straight slots are used. The length of the slots 30, it will be noted, determine the extent or limit of axial screw shift.

Figure 5:
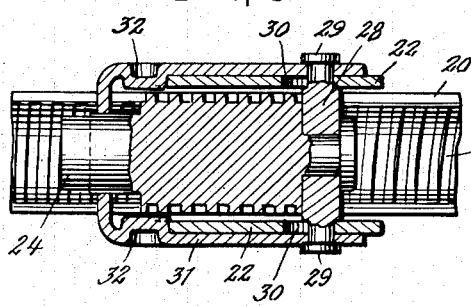
Fig. 5 is a section on the line 5—5 of Fig. 3.

As disclosed in Patent No 2,189,172, the screw 21 is also provided with a substantially U-shaped screw support or carrier 31. Said carrier is adapted to hold the screw within its embrace, as shown in Fig. 5 and to provide also a bearing for the screw extension 24. Toward its forward or free end the carrier is provided with indentations or detents 32 (see Figs. 1, 4, 5 and 6). These detents extend inwardly from the opposite arms of the carrier and are shiftable with the carrier, and hence the screw, from a locking position beneath the extensions 33 formed on the ears 22 to an unlocking position entirely clear of said extensions. At its opposite end the carrier is pivoted to swing with the screw about the axis of the trunnions 29 toward and from the band. If desired, instead of detents, the carrier may be provided with in-struck lugs 34 (see Figs. 7, 8, 10 and 11) or with attached lugs (see Fig. 12); the function of the corresponding parts, in either or any case being identical. Also, if desired, and as a further locking means, a lock wire 36, wired as shown in Fig. 9, may be added.

It having been found that thru-cut threads tend to weaken the band, the present invention contemplates the use of a different type of thread. Square cut threads are used instead. Preferably the band is longitudinally depressed as at 37 toward its opposite ends and the threads are cut only throughout the length of one of said depressed end portions; i. e., the end which is exposed to contact with the operating screw 21 in a clamping operation. The threads, it will be further noted, are cut only part way through the band so as not to weaken it. By depressing the band ends, a greater bearing area of thread contact is provided, and the overlapping band ends are guided in their sliding movement one upon the other.

Figure 6:
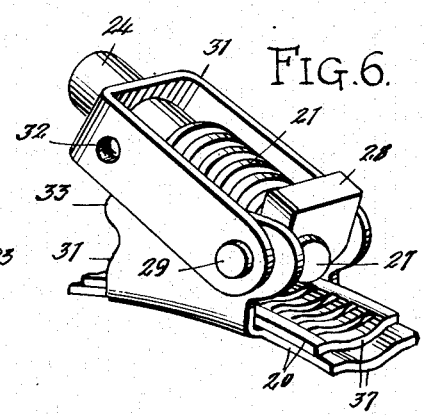
Fig. 6 is a perspective view of the operating screw and its associated mounting means.

In operation, the threaded end of the band is placed in circumferential overlapping engagement with the opposite band end; i. e., between the ears 22 and beneath the screw 21 and disc 28. In so lapping the band ends, the screw 21, along with its support or carrier 31 is positioned as shown in Fig. 6. With the band ends in overlapping engagement, the screw 21 and carrier 31 are reversely moved or swung until the threads of the screw mesh with the threads of the band. Thus positioned, to tighten the clamp, it is only necessary (as by means of a screw driver, pliers or other suitable tool) to rotate the screw about its longitudinal axis. Obviously, as the screw is rotated, it will cause the disc 28 and carrier 31 to first slide lengthwise the slots 30 and the detents 32 to engage beneath the ear extensions 33 to thereby automatically lock the screw in positive contact with the band. Continued rotation of the screw thereafter causes the band ends to slide one upon the other so that the hose or other device around which the band is placed may be tightly clamped.

The improved form of ear and carrier combination is desired for many reasons. In addition to providing a permanent support for the extended end of the screw, the tying together of the otherwise free ends of the ears 22, and the prevention of the accidental contact of the screwdriver (or other tool) with the band in a tightening operation, the carrier serves a further important function. No holes are required for a cotter pin or other separate means for locking the screw and band together; this operation, in the present invention, being positive and fully automatic when the detents engage beneath the ear extensions 33. The slots not only permit the detents to so engage, but they also permit them to disengage when the rotation of the screw is reversed to unlock the support and hence the screw.

A clamp characterized as above set forth is incapable of accidental disengagement. The square cut threads of the band and screw; and the automatic positive lock means of which the improved ears and screw carrier assembly form a part, all contribute to a workable and wholly foolproof clamp. By changing the threads from the buttress to the square type; by not cutting the threads clear through the band; by increasing the number of screw threads; by providing automatic positive locking and unlocking means, and by providing, if desired, a modified screw actuating means (the slotted thumb piece 29), all of the objectionable features of my previously patented clamps have been avoided.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a clamp, a metallic band provided with teeth, a rotatable clamping screw pivoted to said band for pivotal movement bodily into and out of interfitting engagement with said teeth, said screw being adapted also for axial shift relatively to the band in response to screw rotation once said interfitting engagement is established, and means responsive to axial shift of the screw to lock the screw against accidental pivotal movement.

2. In a clamp, a metallic band provided with teeth, a rotatable clamping screw pivoted to said band for pivotal movement bodily into and out of interfitting engagement with said teeth, said screw being adapted also for axial shift relatively to the band in response to screw rotation once said interfitting engagement is established, and means shiftable with the screw in response to axial shift thereof to lock the screw against accidental pivotal movement.

3. In a clamp, a metallic band provided with teeth, ears carried by said band, a rotatable clamping screw pivoted to said ears for pivotal movement bodily into and out of interfitting engagement with said teeth, said screw being adapted also for axial shift relatively to the band in response to screw rotation once said interfitting engagement is established,' and means shiftable with the screw into locking engagement with said ears to lock said screw against accidental pivotal movement.

4. In a clamp, a metallic band provided with teeth, a bodily shiftable screw carrier loosely pivotally fastened to said band, a rotatable clamping screw journaled in said carrier and pivotally movable bodily into and out of interfitting engagement with said teeth, said screw being shiftable with the carrier relatively to the band in response to screw rotation once said interfitting engagement is established, and means on said carrier engageable with means carried by said band to lock said screw against accidental pivotal movement, said carrier means being movable from a non-locking to a locking position and vice versa in response to the shifting movement of said screw and carrier.

5. In a clamp, an elongated metallic strip provided with overlapping end portions, said strip toward each said end portion being longitudinally centrally depressed whereby when said ends are brought into overlapping engagement, said depressed portions are adapted to interfit within and slide one upon the other, square edge threads of a depth less than the thickness of the metal strip cut in one said end portion only, and a rotatable clamping screw carried by the non-threaded end portion of said band and engageable with the threaded end portion thereof, said screw being adapted by its rotation to slide said interfitting end portions one upon the other to tighten and loosen the clamp.

CHARLES E. HATHORN.